US006846852B2

(12) United States Patent
Allen et al.

(10) Patent No.: US 6,846,852 B2
(45) Date of Patent: Jan. 25, 2005

(54) SILOXANE-CONTAINING COMPOSITIONS CURABLE BY RADIATION TO SILICONE ELASTOMERS

(75) Inventors: John Allen, Chesterfield, MO (US); Thomas E. Hohenwarter, Jr., Chester, VA (US); Peter Lersch, Dinslaken (DE); Ernest D. Moore, Prince George, VA (US); Angela Dawn Paez, Hopewell, VA (US); Jörg Simpelkamp, Richmond, VA (US); Steven Paul Smith, Midlothian, VA (US)

(73) Assignee: Goldschmidt AG, Essen (DE)

( * ) Notice: Subject to any disclaimer, the term of this patent is extended or adjusted under 35 U.S.C. 154(b) by 369 days.

(21) Appl. No.: 09/931,339

(22) Filed: Aug. 16, 2001

(65) Prior Publication Data

US 2003/0064232 A1 Apr. 3, 2003

(51) Int. Cl.$^7$ .................................................. C08F 2/46
(52) U.S. Cl. .................. 522/99; 522/148; 522/172; 522/74; 522/71; 522/77; 522/81; 522/82; 522/83; 522/109; 522/110; 528/32; 528/34; 528/18
(58) Field of Search ............... 522/99, 148, 172, 522/74, 71, 77, 81–82, 109, 110, 83; 528/34, 18, 32

(56) References Cited

U.S. PATENT DOCUMENTS

| 4,271,425 A | 6/1981 | Wong |
| 4,575,545 A | 3/1986 | Nakos et al. |
| 4,575,546 A | 3/1986 | Klemarczyk et al. |
| 4,587,159 A | 5/1986 | Gutek et al. |
| 4,666,765 A | 5/1987 | Caldwell et al. |
| 4,675,346 A | 6/1987 | Lin et al. |
| 4,929,647 A | 5/1990 | Burger et al. |
| 4,940,766 A | 7/1990 | Gay et al. |
| 4,963,438 A | 10/1990 | Weitemeyer et al. |
| 4,978,726 A | 12/1990 | Dohler et al. |
| 5,004,643 A | 4/1991 | Caldwell |
| 5,091,483 A | 2/1992 | Mazurek et al. |
| 5,209,965 A | 5/1993 | Caldwell |
| 5,391,405 A | 2/1995 | Irifune et al. |
| 5,418,051 A | 5/1995 | Caldwell |
| 5,494,945 A | 2/1996 | Kidon et al. |
| 5,494,979 A | 2/1996 | Ebbrecht et al. |
| 5,552,506 A | 9/1996 | Ebbrecht et al. |
| 5,863,966 A | 1/1999 | Ebbrecht et al. |
| 6,211,322 B1 | 4/2001 | Döhler et al. |

FOREIGN PATENT DOCUMENTS

EP    0 237 757    9/1987

OTHER PUBLICATIONS

W. Lynch, "Handbook of Silicone Rubber Fabrication," Van Nostrand Reinhold Co., NY 3 97.

*Primary Examiner*—James J. Seidleck
*Assistant Examiner*—Sanza L. McClendon
(74) *Attorney, Agent, or Firm*—Frommer Lawrence & Haug LLP

(57) ABSTRACT

This invention provides for compositions, which can be crosslinked by radiation to give elastomeric coatings, which comprises:

(a) high-molecular weight siloxanes with multiple (meth) acrylate functional groups; and
(b) reinforcing fillers selected from the group consisting of silicone resins and silicone dioxide fillers, wherein the siloxanes (a) have the general structure:

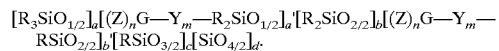

21 Claims, No Drawings

SILOXANE-CONTAINING COMPOSITIONS CURABLE BY RADIATION TO SILICONE ELASTOMERS

BACKGROUND OF THE INVENTION

1. Field of the Invention

This invention relates to compositions containing high-molecular weight siloxanes with multiple (meth)acrylate functional groups and reinforcing fillers, which can be crosslinked by radiation to give elastomeric coatings useful for a variety of applications.

2. Description of the Related Art

Silicone rubbers are versatile materials useful in a variety of applications. The most common method of producing silicone rubbers is by compounding gums of high molecular weight polyorganosiloxanes, filler, processing aids and peroxide curing agents and then curing at elevated temperature (150° C. to about 250° C. depending on the peroxide).

In order to obtain uniform rubbers, the gum, fillers and additives have to be mixed thoroughly e.g. in a Banbury or Bread Dough mixer. The peroxide curative can then be added on a two-roll mill before the rubber is press molded, Hot Air Vulcanized, oven-cured, or steam-cured. See W. Lynch, "Handbook of Silicone Rubber Fabrication," Van Nostrand Reinhold Co., NY, 3 97. However curing and processing of these gums is difficult and slow.

Another form of silicone rubber is known as room temperature vulcanizing silicone rubbers. This type of product, usually designated as RTV's, employ liquid low molecular weight polyorganosiloxanes, crosslinkers, fillers and catalysts. They are available as one part and two part systems. The one part system normally consists of a hydroxyl terminated polyorganosiloxane, triacetoxy or trimethoxy containing silanes as crosslinkers, organometallic catalysts and fillers. The curing is effected by moisture. The two part system comprises a silicon hydride crosslinker in one part, and a vinyl containing silicone, platinum catalysts, and fillers in the second part. Upon mixing the two parts, the curing takes place.

Both types of RTV's generally display similar properties to the heat cured silicone gum rubbers. Their viscosities range from easily pourable liquids to thixotropic pastes, therefore, they are useful as adhesives, coatings and sealants.

However, a complete curing to form rubber usually takes several hours or even days at room temperature, although cure time can be reduced by using elevated temperatures.

Silicone compounds calendared onto glass cloth, fabric, or other substrate may be cured with one of several common thermal peroxide catalyzed processes. Two of the most popular curing processes are Autoclaving and Rotocure.

Usually expensive polyester interlayers are required to prevent backside/frontside bonding which, if not used, would be a problem for calendared rolls cured in an autoclave. In addition, autoclave curing of rolls takes 12 to 16 hours at the appropriate peroxide temperature; and, the cure achieved is not always uniform across the width of the roll.

In the Rotocure process, the peroxide catalyzed silicone calendared glass cloth, fabric, or other substrate is brought and kept into contact with a large diameter heated metal cylinder. Typical peroxide cures take three to five minutes to achieve. A Rotocure drum with a diameter of five feet would require a drum speed of less than six to ten feet per minute to achieve a satisfactory cure.

U.S. Pat. No. 4,587,159 describes silicone coated fabric made by coating with a silanol-terminated polydimethylsiloxane and an aluminum catalyst, followed by thermal treatment. However, these condensation curing systems suffer from slow curing times, lower line speeds and the need for a subsequent oven post-curing.

U.S. Pat. Nos. 5,004,643, 5,209,965 and 5,418,051 describes a process for treating porous webs, e.g. fabric, to produce internally silicone-coated webs, using RTV-type silicone compositions containing hydrogen siloxanes, vinyl siloxanes and a platinum catalyst. U.S. Pat. No. 4,666,765 describes silicone-coated fabrics containing different coats made from compositions containing hydrogen siloxanes, vinyl siloxanes and a platinum catalyst. However, these platinum-cured systems also suffer from slower curing times and do often require extended oven post-cure times, thus not allowing high production rates.

Thermal processes usually require peroxide or other catalysts, often resulting in the need for subsequent post-curing to remove the volatile, and sometimes corrosive, by-products of standard heat-cured processes.

Since usually supplemental curative materials are necessary in these processes, compounding can be cumbersome, pot-life and compound stability are limited, thus resulting in increased amounts of scrap material.

In the area of Conformal Coatings for use in electronic and optical devices, platinum-catalyzed systems typically use expensive metering and mixing equipment which requires shut-down and clean-out when making product changeovers. Formulation is also sensitive and usually requires that such formulation be done at the silicone supplier rather than at the user due to potential loss of catalyst activity, cross-contamination problems and other mixing errors.

It is desirable therefore that silicone compositions, which may be easily processed and handled and are capable of very rapid curing at or near room temperature to elastomeric silicone rubbers useful as coatings of fibres, webs and sheet-like carriers, be developed.

Radiation-curable silicones bearing (meth)acrylate groups have been known to show excellent curing speed and properties. They are widely used as release-coatings, for example for paper substrates.

U.S. Pat. No. 4,978,726 describes siloxanes with terminal acrylate groups which are useful as radiation-curable coating materials for sheet-like carriers.

U.S. Pat. No. 5,494,945 describes siloxanes with terminal and/or pendant acryloxyalkyl groups with chain lengths of less than N=330 useful for release coating applications.

U.S. Pat. No. 5,391,405 describes branched siloxanes with terminal and/or pendant acryloxyalkyl groups for release coating applications.

U.S. Pat. No. 5,494,979 descibes compositions for abhesive coatings containing additives made from acrylated MQ resins and siloxanes having terminal and pendant acrylate groups but <100 unsubstituted dimethylsiloxane units.

U.S. Pat. No. 5,863,966 describes siloxanes with multi-functional (meth)acrylate headgroups for use in radiation-curing printing inks.

However in order to make coatings with elastomeric properties, the presence of longer uninterrupted polydimethylsiloxane segments and fewer acrylate groups is desired, which has adverse effects on the curing speed.

U.S. Pat. No. 4,675,346 describes UV-curable silicone rubber compositions containing siloxanes with two terminal (meth)acryloxypropyl groups, and fillers. It teaches that such siloxanes become uncurable for long-chain silicones (>50000 m.w).

U.S. Pat. No. 4,929,647 describes radiation curable compositions containing acrylate-functional siloxanes groups and SiH-containing MQ resins. The siloxane contains only two acrylate groups which are present in the terminal positions of the polymer chain.

U.S. Pat. No. 4,963,438 describes siloxanes with terminal and/or pendant acryloxyalkyl groups for applications as radiation-curable adhesive coatings. However, linear materials of that type have no more than 2000 dimethylpolysiloxane units.

U.S. Pat. No. 4,940,766 describes siloxanes with terminal and/or pendant acryloxyalkyl groups with chain lengths up to N=~500.

EP 0237757 describes UV curable elastomer coatings from αω (meth)acryloxy-alkylfunctional siloxanes which also have mercapto groups. These elastomers however have viscosities of less than 50000 mPas and do not have the desired long chain lengths displayed by the siloxanes used in this invention. In addition, mercaptofuntional siloxanes are more expensive, difficult to prepare and handle, and have an undesirable odor.

U.S. Pat. Nos. 4,575,546 and 4,575,545 describe radiation-curable silicones having multiple (meth)acryloxyalkyl-functional siloxane units clustered near the end of the chain ends. They are made in a complicated and expensive process via the polymerisation of methyl and vinyl functional trisiloxanes, followed by hydrosilylation with acrylate-functional SiH functional siloxanes.

U.S. Pat. No. 5,091,483 describes radiation-curable elastomers made from siloxanes with a chain length of less than ~1000 units which contain terminal monoacrylate groups bound via an amide-containing spacer group. These compounds suffer from a lengthy and uneconomical synthesis, and lack the multiple acrylate groups required for fast curing of high molecular weight systems. U.S. Pat. No. 6,211,322 describes organosilicon compounds comprising terminally and/or laterally at least one Si—C-bonded organic radical which has at least two (meth)acrylate groups and optionally also monocarboxylic acid groups, free from double bonds, attached by way of primary hydroxyl groups, and their preparation. However, no linear materials of that type with more than 1000 dimethylpolysiloxane units are described.

OBJECTS OF THE INVENTION

It is an object of this invention to provide compositions comprising high-molecular weight siloxanes with multiple (meth)acrylate functional groups and reinforcing fillers, which can be crosslinked by radiation to give elastomers and elastomeric coatings. It is a further object of this invention to provide a process for preparing elastomers and elastomeric coatings of various substrates by irradiating compositions comprising high-molecular weight siloxanes with multiple (meth)acrylate functional groups and reinforcing fillers.

SUMMARY OF THE INVENTION

The compositions described in this invention comprise
(a) one or more high molecular weight silcone polymers having multiple (meth)acrylate functional groups;
(b) one or more reinforcing fillers which are selected from the group consisting of silicone resins or silicone dioxide fillers; and optionally
(c) additional ingredients like extending fillers, catalysts/photoinitiators/photosensitizers, crosslinkers, pigments/dyes and additives.

DETAILED DESCRIPTION OF THE INVENTION

The silicone polymers (a) with multiple (meth)acrylate functional group have the general structure:

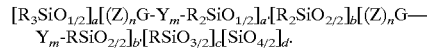

wherein

R is a linear or branched, alkyl, alkenyl or aryl radical which may be substituted with halogen atoms, $G(Z)_n$ is a (meth)acrylfunctional radical, wherein G is a (n+1) valent radical derived from a hydroxy compound with 3 to 10 carbon atoms, 1 to 6 hydroxy groups, 0 to 1 carboxylic ester groups and 0 to 2 ether linkages, which may optionally be unsaturated or alkoxylated with ethylene oxide, propylene oxide or mixtures thereof, Y is —OOC—CHR'—CH$_2$— or —OOC—CHR'(CH$_3$)—, m is 0 or 1, n is 1–6, Z is —C(O)—CR'=CH$_2$ and may additionally comprise carboxylic acid radicals free of double bonds, R' is hydrogen or methyl, a is 0–20, a' is 0–10, b is 800–10000, b' is 0–40, c is 0–40, and d is 0–40, with the proviso that the polymer contains more than two (meth)acrylate groups.

Preferred radicals R are selected from the group of alkyl radicals with 1–8 carbon atoms, fluorinated alkyl radicals with 1–8 carbon atoms, such as trifluoropropyl, vinyl or phenyl. Especially preferred radical R is methyl. Preferred group Z containing double bonds is —C(O)—CH=CH$_2$. Preferred optional group Z free of double bonds is —C(O)—CH$_3$. Especially preferred are siloxanes wherein the group Z is only —C(O)—CH=CH$_2$. Preferred range for a is 0 to 2, preferred range for a' is 0–2, preferred range for b is 2100–5000, preferred value for b' is 0–10, preferred value of c and d is 0.

Preferred structures G for m=0 are:

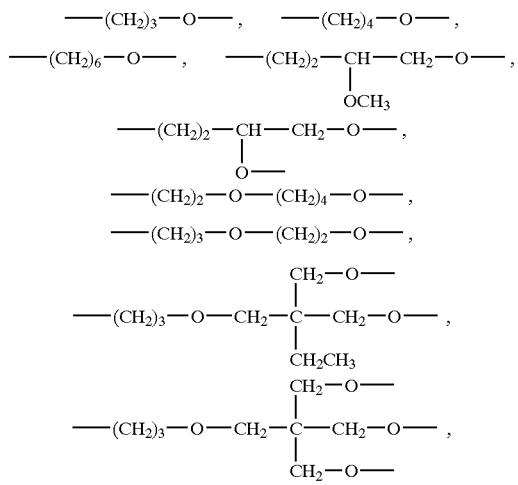

-continued

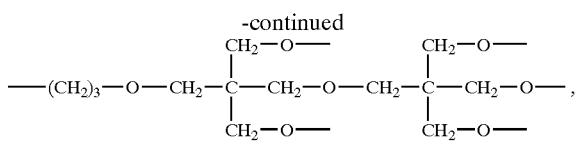

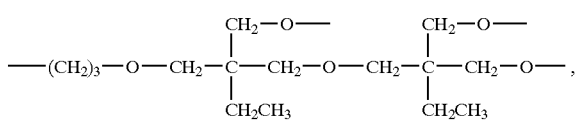

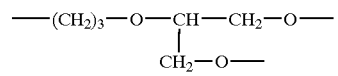

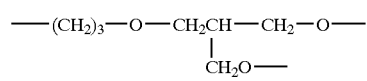

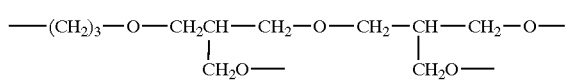

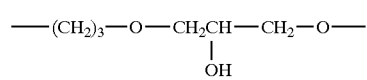

Especially preferred radicals G for m=0 are:

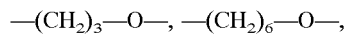

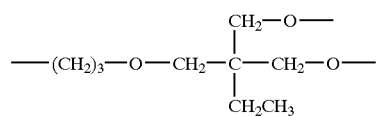

Preferred structures —Y—G(Z)$_n$ for m=1 are:

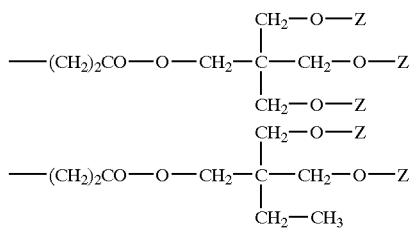

The silicones (a) may contain additional co-curable groups such as silanol or alkoxy groups.

The skilled worker is aware that the acrylate-modified organopolysiloxanes, where the organic groups bearing the acrylate radical(s) are attached to the siloxane framework by way of Si—C bonds, are superior in terms of stability to hydrolysis to those compounds where linkage is via an Si—O—C bond. Therefore the acrylate functional radical are preferably bound via Si—C linkages, but may contain, as is well known to the practitioner of the art, some Si—O—C linked groups as by-products in a range of 0 to 25% of the total linkages. A content of less than 10% SiOC groups is preferred, less than 5% especially preferred. It is also well known to the practioner of the art that Si—C bound radicals Si—G(Z)$_n$ formed by hydrosilylation reaction can contain, apart from the linear structure depicted in the formulas above, some branched material, for example Si—CH(CH$_3$)—CH$_2$— instead of Si—(CH$_2$)$_3$—, Si—CH(CH$_3$)— instead of Si—(CH$_2$)$_2$—, and that also dehydrogenative elimination may occur as a side reaction, for example leading to groups Si—CH=CH—CO— instead of Si—CH$_2$CH$_2$—.

It is well known to the practitioner of the art that the decribed siloxane polymers are a distribution of entities of different chain lengths and molecular weight, and that the structural description given is the average composition as is common in the field of polymer chemistry. It is equally well known in the field of silicone chemistry that siloxane polymers may contain cyclic siloxane species in typical ranges of up to 15 wt %.

Typical examples for siloxane polymers (a) are:

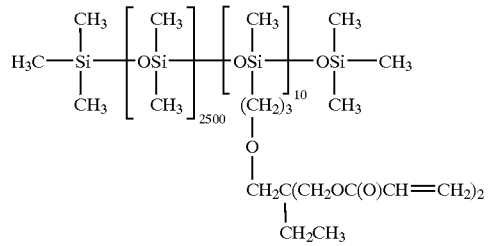

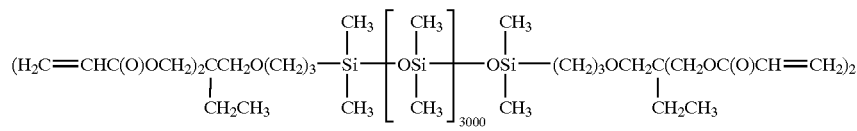

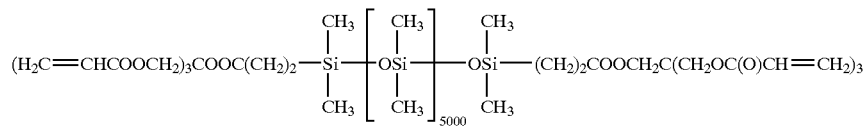

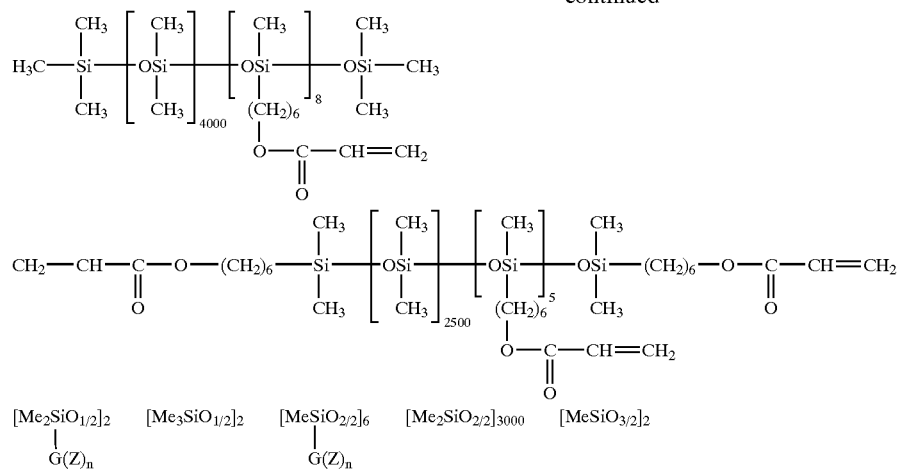

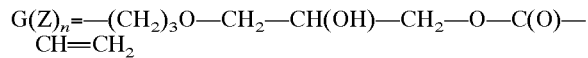

$G(Z)_n$=—$(CH_2)_3$O—$CH_2$—CH(OH)—$CH_2$—O—C(O)—CH=$CH_2$

The high molecular weight acrylate-functional silicones may be prepared, for example, by hydrosilylation of high molecular weight Si—H functional siloxanes with compounds having multiple olefinic double bonds such as, for example, the esters of multivalent alcohols such as glycerol, pentaerythritol or trimethylolpropane with acrylic or methacrylic acid, in the presence of hydrosilylation catalysts such as, for example, platinum or rhodium componds of the oxidation state I, II or III. The high molecular weight acrylate-functional silicones may further be prepared, for example, by esterification or interesterification of high molecular weight hydroxyalkyl-functional siloxanes with (meth)acrylic acid or derivatives thereof in the presence of a suitable esterification or interesterification catalyst.

Preferred method for preparing the high molecular weight siloxanes used in this invention is the equilibration/redistribution reaction of low molecular-weight acrylate-functional siloxanes with materials containing unsubtituted dimethylsiloxane units, such as, for example, silicone oils, polydimethylsiloxanes and/or cyclic siloxanes such as, for example $(SiMe_2O)_n$ with n=3–6, preferably n=4 or 5, in the presence of a catalyst.

Suitable catalysts are the equilibration/redistribution catalysts well-known to the practioner in the field of silicone chemistry. Typical examples are organic or inorganic acids, for example sulfuric acid, sulfonic acids such as methane sulfonic acid or trifluoromethane sulfonic acid, acidic heterogeneous catalysts like ion exchanger resins or acidic/acid-activated clays and minerals, bases such as metal or tetraalkylammonium hydroxides, alkoxides or silanolates, or phosphonitrilic chlorides and its derivatives. Preferred catalysts are acidic catalysts, especially preferred sulfonic acid catalysts.

The reaction to form high molecular weight multiacrylate-functional silicones can be performed in organic solvents, for example aliphatic or aromatic hydrocarbons such as toluene, or solvent-free, at room temperature or elevated temperatures. The solvent and volatile components such as cyclic siloxanes may be removed, for example under reduced pressure.

The catalyst may be neutralized or removed by addition of a suitable base or acid, respectively, by filtration, or by adsorption to a heterogeneous material. For acidic catalysts, the neutralizing agent may be a base such as for example, amines, metal or tetraalkylammonium hydroxides, oxides or carbonates. Preferred agents to inactivate acidic catalysts are heterogeneous bases such as carbonates, hydrogen carbonates, hydroxides and oxides which can also function as a filler, such as for example the carbonates, hydrogen carbonates, oxides or hydroxides of magnesium, calcium or barium. In a preferred method, these neutralizing agents are not removed but remain in the siloxane polymers and in the final compositions made thereof.

The low molecular-weight acrylate-functional siloxane can be prepared by the methods decribed above, for example by hydrosilylation of Si—H functional siloxanes with compounds having multiple olefinic double bonds or by esterification or interesterification of hydroxyalkyl-functional siloxanes with (meth)acrylic acid or derivatives thereof.

Typical examples of lower-molecular weight siloxanes useful for the preparation of the high molecular weight siloxanes described in this invention are the siloxane polymers described in U.S. Pat. Nos. 6,211,322, 5,863,966, 5,552,506, 4,978,726, and 496,343, which are incorporated herein by reference.

The siloxanes may have a branched siloxane backbone characterized by the presence of units $[RSiO_{3/2}]_c$ or $[SiO_{4/2}]_d$, which can be introduced, for example, by including silicone resins, or silanes of the type $RSiX_3$ and $SiX_4$, into the equilibration/redistribution reaction mixture, wherein X is —Cl or —OR" wherein is R" is an alkyl radical with 1 to 5 carbon atoms, preferably methyl or ethyl. Preferred silicone resins for this purpose are the resins described as reinforcing fillers in this invention, or the reaction products of silicone resins with acrylate-group containing silicones as described in U.S. Pat. No. 5,494,979 which is incorporated herein by reference.

The reinforcing agents (b) can be selected from the group of:

(A) functional MQ Resins having silicon-bound methyl groups, silicon-bound functional groups from the group of hydroxy, hydrogen, alkoxy, (meth)acryloxy and optionally silicon-bound groups from the group of phenyl, fluorinated alkyl, amino, vinyl and allyl.

(B) fumed silica, precipitated silica, hydrosols or silicates.

A preferred filler is silicon dioxide having a specific surface area of at least 150 $m^2$/g. This silicon dioxide may be pyrogenically produced, usually referred to as fumed silica; or, silica hydrogels which have been dehydrated while maintaining the necessary structure. This type of reinforcing silica is generally referred to as precipitated silica.

These silicas and any other of the reinforcing type silica may be hydrophilic; or if it has been treated for example with a water repellent organosilicon compound, such as ethoxytrimethylsilane, dimethyldichlorosilane, chlorotrimethylsilane, octamethylcyclotetra-siloxane, or hexamethyldisilazane, in the presence or absence of some of organopolysiloxane (a) used in the preparation of the compositions of this invention, then it may be hydrophobic. Silicon dioxide having a specific surface area of at least 150 m$^2$/g which has been rendered hydrophobic by treatment with hexamethyldisilazane is particularly preferred. The values for specific surface areas are BET values, i.e., values which are determined by means of nitrogen adsorption in accordance with ASTM Special Technical Publication No. 51 (1941), pages 95ff.

Other treating agents that can be used to treat the reinforcing fillers (A) and (B) are, for example, silanol fluids, like polydimethylsiloxanes, optionally containing silicon-bound phenyl, alkyl or fluorinated alkyl groups, or silane coupling agents well known to the practitioner of the art, such as gamma-aminopropyltrimethoxysilane or gamma-methacryloxypropyltrimethoxysilane.

The resins (A) can have the general structure

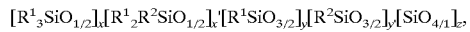

wherein
R$^1$ is a monovalent alkyl or alkenyl radical with 1 to 4 carbon atoms, phenyl, hydroxy, methoxy or ethoxy,
R$^2$ is a (meth)acrylated hydroxyalkyl radical with 1 to 6 carbon atoms in the alkyl group;

The number average molecular weight of the siloxane resin shall be 500 to 100000, x, x', y, y' and z being numbers the value of which arise, in conjunction with the molecular weight out of the proviso that the ratio (x+x')/(y+y'+z) is 0.5 to 1.5 and the ratio (y+y')/z is 0 to 0.4.

Preferred radical R$^1$ is methyl. If R$^1$ is a hydroxy or alkoxy group, it is preferred that only a portion of the R$^1$ groups have this meaning, that is, the content of silicon-bound hydroxy or alkoxy groups, based on the weight of the siloxane resin, shall preferably be less than 4% by weight and particularly less than 2% by weight.

Preferred radical R$^2$ is —(CH$_2$)$_2$—O—C(O)—CH=CH$_2$ (acryloxyethyl) or —CH$_2$)$_3$—O—C(O)—CH=CH$_2$ (acryloxypropyl).

Preferred are resins with a molecular weight of 500 to 10000.

Further preferred are resins wherein y and y' are 0, and the ratio (x+x')/z is 0.5 to 1.2, especially preferred 0.7 to 0.9.

One example for a preferred MQ resin having acrylic groups, for example to improve cure with the main polymer matrix, is

wherein
(x+x')/z=0.8 such as that for x=23, x'=1, and z=30, having a molecular weight of approximately 4000 g/mol, and approximately 0.25 mmols of functional acrylic per gram of solid resin.

One example for a preferred MQ resin having no acrylic groups and comprising some silanol functionality, for example to add tackiness to a cured polymer matrix, is [(CH$_3$)$_3$SiO$_{1/2}$]$_x$[SiO$_{4/2}$]$_z$,
wherein
(x+y)/z is 0.8 such as that for x=24; and z=30 having a molecular weight of approximately 4000 g/mol and approximately 1.25 mmols of functional silanol OH per gram of solid resin.

The compositions of this invention may also comprise other ingredients to modify the cured or uncured properties as desired for specific applications.

The curable compositions may comprise additional crosslinkers like linear, branched, or MQ type silicone polymers containing multiple (meth)acrylate groups, organic polymers containing multiple (meth)acrylate groups, silanes containing (meth)acryloxy groups, or silanes containing (meth)acryloxyalkyl groups. The curable compositions may contain other co-curing additives such as trialkylisocyanurate or triallylisocyanurate, or multifunctional (meth)acrylates derived from polyhydric alcohols such as, for example, butanedioldiacrylates, pentaerythrit triacrylate, pentaerythrit tetraacrylate, trimethylolpropane triacrylate or glycerol triacylate.

The compositions of this invention may comprise further additives to influence the final properties of the coatings: adhesion promoters, e.g. silane coupling agents such as gamma-methacryloxypropyltrimethoxysilane or gamma-glycidoxypropyltrimethoxysilane, antimicrobial agents, antifungal agents, stain/grease resistant agents, flow control agents like silicone oils, surface tension controlling additives like wetting agents, UV absorbers, hand altering agents, bio-compatable proteins, antistatic additives, surface-modifying and handling agents: like Teflon powders, flame retardants, intumescent agents, blood repellents, flattening agents, dulling agents, reflectivity enhancers, and the like, which modify a substrate's response to light and radiation. Other optional ingredients are nonacrylic silicone diluents or plasticizers. The nonacrylic silicones include trimethylsilyl terminated oils of 100–1500 cst viscosity and silicone gums.

The composition may comprise extending fillers like talc, clay, the carbonates, hydrogen carbonates, oxides or hydroxides of magnesium, calcium or barium, titanium dioxide, barium zirconate, chalk, quartz, diatomaceous earth, polymeric beads/powders, iron oxide, electrical conductive materials like metal powders, carbon black, metal salts, thermal conductive agents like metal powders, magnetic or radio masking agents like barium titanate. Preferred extending fillers are carbonates, oxides or hydroxides of magnesium, calcium or barium, or silicon dioxide fillers such as quartz or diatomeceous earth.

The compositions may comprise pigments, dyes and/or fluorescing agents, for example those those which promote the effectiveness of photoinitiators since these dyes have absorption maxima in the range of from 300 to 500 nm, such as Nitrazine Yellow, Disperse Orange 3 and/or Nile Blue A.

The compositions of this invention are crosslinked by exposure to radiation to form elastomers. Sources of radiation which may be employed are electron irradiation, gamma irradiation, X-ray irradiation or preferably, in the presence of a suitable photoinitiator, light such as daylight, light having a wavelength of from 400 to 600 nm (nanometers), i.e. so-called "halogen light", or ultra-violet light, or a mixture of at least two such types of irradiation, and in particular at least two such types of light. Light having a wavelength of from 200 to 300 nm is particularly preferred. The ultra-violet light may be produced, for example, in xenon lamps, low-pressure mercury vapor lamps, medium-pressure mercury vapor lamps or high-pressure mercury vapor lamps. If the compositions of this invention are to be crosslinked by means of at least one of the types of light mentioned above, they must contain at least one photoinitiator. Examples of suitable photoinitiators are benzophenone and substituted benzophenones, such as hydroxybenzophenones, 2,4-bis(trimethylsiloxy) benzophenones, 4-methylbenzophenone, 4-chlorobenzophenone, 4,4'-dimethoxybenzophenone and 4-chloro-4'-benzylbenzophenone; xanthone and substituted xanthones, such as 3-chloroxanthone, 3,9-dichloroxanthone and 3-chloro-8-nonylxanthone; acetophenone and substituted acetophenones, such as diethoxyacetophenone, 2-hydroxy-2-methyl-1-phenylpropan-1-one, trichlorobutylacetophenone, 3-methylacetophenone, 4-methylacetophenone and 3-bromoacetophenone; anthraquinone and substituted anthraquinones, such as chloroanthraquinone; benzoin and substituted benzoins, such as benzoin alkyl ethers, for example, benzoin methyl ether, benzoins in which the hydrogen atom of the hydroxyl group in the benzoin is replaced by a silicon atom of a cyclic organopolysiloxane, such as described in German Patent Application No. DE-OS 3,123,676 (Shin-Etsu Chemical Co., Ltd.), and benzoin derivatives which are obtained by reacting benzoin with, for example, triethanolamine in the absence of halogen bonded directly to silicon, in the absence of acid which is more acidic than benzoin, and in the absence of a base which is more basic than triethanolamine; thioxanthone and substituted thioxanthones; benzil and substituted benzils, such as benzil ketals; and also fluorenone and substituted fluorenones. Additional examples of photoinitiators which may be employed are mesityl oxide, propiophenone, benzaldehyde, carbazole and Michler's ketone. The photoinitiator may also be polymer bound. Such photoinitiators are described in U.S. Pat. No. 4,271,425 and in copending applications, Ser. Nos. 505,588 and 528,287.

The base compositions of this invention can contain 50–90 wt % of one or several acrylate-functional silicone polymers (a) and 10–50 wt % of one or several reinforcing fillers (b) from the group of MQ resins and silicon dioxide fillers or mixtures thereof, which may optionally be treated with a treating agent. Optionally, per 100 weight parts of such a base composition described above, the compositions described in this invention may contain 0–150 parts, preferred 20–50 parts, of extending fillers, and 0–15 parts, preferred 0–6 parts, each of other ingredients such as photoinitiators, crosslinkers, pigments, dyes and additives.

If they are to be crosslinked by means of at least one of the types of light mentioned above, the compositions of this invention preferably contain a photoinitiator in an amount of 1 to 6 wt.-parts, especially preferable 2–4 parts, phooinitiator per 100 parts of the base composition described above. Especially preferred are substituted acetophenones such as 2-hydroxy-2-methyl-1-phenylpropan-1-one.

In addition, the compositions may contain free-radical generating agents such as peroxides.

The compositions described in this invention can be cured with high curing speeds of up to 800 feet/min without the need for thermal post-cure, thus providing significant advantages in terms of energy consumption and process costs. The possibility to cure the materials at low temperatures allows the coating of heat-sensitive substrates. The cure can be accomplished immediately after the coating or impregnation step is complete, eliminating the possibility of undesirable migration by the liquid as it waits to be cured. In addition, the compositions of this invention show high stability and shelf-life, thus reducing the amount of process-related scrap material. They require only minimal post compounding, no solvents, offer better mixed stability and improved ease of handling. The high stability of the composition allows the user to perform further modifications and adjustments of the compositions on-site, e.g. by adding pigments and additives. The radiation-curable systems do not show the formation of volatile or corrosive by-products which is known for some other silicone elastomer systems. The compositions and coating process of this invention are very versatile and can be used for a wide variety of different substrates and applications.

Elastomers produced from such a curing reaction are known to demonstrate toughness, tensile strength, and dimensional stability.

Using the radiation-curable compositions of this invention can eliminate the need for expensive polyester interlayers used to prevent backside/frontside bonding when curing silicones calendared onto glass cloth. In contrast to slow autoclave curing, Rotocure curing or solvent-based processes, e-beam cure of calendared silicone products is considerably faster. The same length roll often can be uniformly e-beam cured in a matter of minutes even when the e-beam is running at 400 feet per minute or more.

A particular advantage exists in this process if the e-beam is in line with the coater. Under such conditions, it is possible to coat the glass cloth, fabric, or other substrate with solvent-free (100% solids) pourable or thixotropic liquids and cure them immediately. This not only takes advantage of the inherent run speed. It also addresses the silicone solvent dispersion, solvent removal and recovery problems inherent in solvent-based processes.

In addition, the speed of the e-beam curing process, which is many times that of these slower thermal processes, may allow several calendars or fluid coating stations to be ganged together resulting in considerably higher production rates.

An allied process in which silicone compounds are extruded as tubing, on wire (wire and cable products), and as flat or semi-flat strip sealing material and cured in a Hot Air Vulcanization (HAV) unit may also be replaced using e-beam cure.

Similar advantages apply to UV-curable compositions made according to this invention.

The compositions of this invention can be produced by simply mixing the components with one another. Volatile components can be removed from these compositions by reducing the pressure during or after mixing.

The compositions of this invention may be employed in all applications in which compositions which can be crosslinked by radiation to form elastomers or elastomeric coatings can be employed, such as for example in the formation of coatings, for example, of organic fiber or glass fiber textiles, including optical fibers, textiles, fibres and webs comprised of synthetic organic polymers such as polyamides (nylons), polyesters such as polyethylene terephthalate, polyolefins such as polypropylene and polyethylene, acrylics, regenerated cellulose, cellulose acetates, acetate, ramids, azlons, modacrylics, novoloids, nytrils, rayons, sarans, spandex, vinal, vinyon, and the like, or natural fibrous such as cotton, linen, wool, and silk, or blends of natural and synthetic materials, paper, leather, metals, cellulosic substrates, sheets and films of organic or inorganic polymers such as polyamides (nylons), polyesters such as polyethylene terephthalate, polyolefins such as polypropylene and polyethylene, acrylics, or electronic and electric components such as hybrid integrated circuits, for example, for electronic ignition systems, of modules, photovoltaic solar generators and other semiconductor arrangements. Other substrate which may be coated include metallic strands, fibers, wires, sheets and fabrics. When the compositions are used for coatings, it is preferred that the coating be from 0.5 mm to 2 cm in thickness.

The compositions of this invention can be applied by web application (as cured or uncured material for UV and EB applications) by coating or calandering, by extrusion (self supported or with web or with filament), by dipping, spraying, sputtering, or by mechanical application by a brush, rod or roll.

The elastomeric coatings of this invention can be used as potting compounds for electrical and optical components, for encapsulation, as dampening materials, for conformal coatings, as pressure sensitive adhesives, as bonding agents, for fabric treatments, as gasket stock, for extruded seal constructions, insulation treatment, sound dampening, electrical conductive fabrics, RF masking constructions, or as bonding adhesive or bonding interlayer.

EXAMPLES

The following examples are illustrative, but not limiting, to the invention.

Materials:

Acrylate-functional siloxane copolymer 1, having the structure $[(Z)_nG—SiMe_2O_{1/2}]_2[Me_2SiO_{2/2}]_5[(Z)_nG-SiMeO_{2/2}]_5$ wherein $G(Z)_n$ is $—(CH_2)_6O—C(O)—CH=CH_2$, is prepared in analog to U.S. Pat. No. 4,963,438, example 1.

Acrylate-functional siloxane copolymer 2, having the structure $[(Z)_nG-SiMe_2O_{1/2}]_2[Me_2SiO_{2/2}]_8$ wherein $G(Z)_n$ is $—(CH_2)_3O—CH_2—C(CH_2CH_3)(CH_2O—C(O)—CH=CH_2)_2$, is prepared as described in U.S. Pat. No. 6,211,322, example 1.

Acrylate-functional siloxane copolymer 3, having the structure $[(Z)_nG-SiMe_2O_{1/2}]_2[Me_2SiO_{2/2}]_8$ wherein $G(Z)_n$ is $—(CH_2)_2COO—CH_2—C(CH_2O—C(O)—CH=CH_2)_3$ (major) and $—(CH=CH)—COO—CH_2—C(CH_2O—C(O)—CH=CH_2)_3$ (minor), is prepared as described in U.S. Pat. No. 5,863,966, example 1.

Example 1

11300 g of octamethylcyclotetrasiloxane and 45 g of acrylate-functional siloxane copolymer 1 are charged to a planetary type mixer equipped with heating jacket, thermometer and rated for vacuum operation. Start mixer at a low mixing speed. Once mixer is sealed, nitrogen flow is added and temperature is increased to 80° C. Once reaction temperature is stable at 80° C., 16 g of trifluoromethanesulfonic acid is added. Re-seal mixer and continue nitrogen flow. Allow polymer to equilibrate for 4 hours after onset of polymerization. Cool polymer and remove from mixer at room temperature. (pending: neutralization details) Product is a high molecular-weight gum-like silicone polymer of average chain length ~5000, suitable for use in Electron Beam and Ultra-Violet cured compositions.

Example 2

Charge 11575 g of octamethylcyclotetrasiloxane and 75 g of acrylate-functional siloxane copolymer 1 to a planetary type mixer equipped with heating jacket and rated for vacuum operation starting the mixer at low speed. Add a nitrogen atmosphere to the vessel once the mixer is sealed and increase reaction temperature to 80° C. When temperature is reached, 16 g of trifluoromethanesulfonic acid is added. Once addition is complete, re-seal mixer and continue nitrogen flow. Allow polymer to equilibrate for 4 hours after onset of polymerization. Cool polymer and remove from mixer at room temperature. Product is a high molecular-weight silicone polymer of average chain length ~3000, suitable for use in Electron Beam and Ultra-Violet cured compositions.

Example 3

11273 g of octamethylcyclotetrasiloxane and 77 g of acrylate-functional siloxane copolymer 2 are charged to a planetary type mixer equipped with heating jacket and rated for vacuum operation. Beginning speed is low. Seal mixer, add nitrogen flow and reaction temperature is increased to 80° C. Once mixer and contents reach 80° C., add 16 g of trifluoromethanesulfonic acid. Re-seal mixer and continue nitrogen flow. Allow polymer to equilibrate for 4 hours after onset of polymerization. Cool polymer and remove from mixer at room temperature. Product is a high molecular-weight silicone polymer of average chain length ~2500, suitable for use in Electron Beam and Ultra-Violet cured compositions.

Example 4

Charge 11280 g of octamethylcyclotetrasiloxane and 66 g of acrylate-functional siloxane copolymer 3 to a planetary type mixer equipped with heating jacket and rated for vacuum operation. Start mixer at a low speed. Seal mixer, add nitrogen flow and raise temperature to 80° C. Once mixer and contents reach 80° C., add 16 g of trifluoromethanesulfonic acid. Re-seal mixer and continue nitrogen flow. Allow polymer to equilibrate for 4 hours after onset of polymerization. Cool polymer and remove from mixer at room temperature. Product is a high molecular-weight silicone polymer of average chain length ~3000 suitable for use in Electron Beam and Ultra-Violet cured compositions.

Example 5

531 g decamethylcyclopentasiloxane and 9 g of acrylate-functional siloxane copolymer 3, and 0.5 ml of trifluormethanesulfonic is stirred for 6 hours at 100° C. in a 1000 ml four-neck reaction flask equipped with a stirrer, thermometer and a reflux condenser. While the reaction is being cooled to 80° C., 5.4 g sodium bicarbonate and 0.1 g of distilled water are added to the flask and stirring continued for four hours. 270 g xylene is incorporated into the reaction product at this temperature following neutralization. Residues are removed through filtration. Volatile by-products and solvent are removed by distillation at 140° C. under an oil-pump vacuum. Product is a high molecular-weight silicone polymer of average chain length ~1200 suitable for use in Electron Beam and Ultra-Violet cured compositions.

Example 6

14 g of acrylate-functional siloxane copolymer 2 and 734 g octylmethylcyclotetrasiloxane is charged to a 1000 ml four-neck reaction flask equipped with a stirrer, thermometer and a reflux condenser. To the reaction mixture 0.4 ml of trifluormethanesulfonic acid is added at room temperature and the reaction flask is then heated to 100° C., while stirring resumed for 6 hours. Following, 0.36 g calcium hydroxide is added and the reaction product is cooled to 80° C., with stirring continuing for 1 hour at that temperature. 0.15 ml of distilled water are added to the flask and stirring continued for four hours. The reaction product is bottled without further filtration or distillation. Product is a high molecular-weight silicone polymer of average chain length ~1000 suitable for use in Electron Beam and Ultra-Violet cured compositions.

Example 7

882 g octylmethylcyclotetrasiloxane and 14 g acrylate-functional siloxane copolymer 2 is charged to a 3000 milliliter four-neck reaction flask equipped with a stirrer, thermometer and a reflux condenser. After adding 0.9 ml of trifluormethanesulfonic acid at room temperature, the mixture is stirred at 100° C. for 4 hours. While the reaction is being cooled to 80° C., 18 g sodium bicarbonate and 0.2 g of distilled water are added to the flask and stirring continued for four hours. 270 g of xylene is incorporated into the reaction product following neutralization with stirring continuing for two hours at this temperature. Residues are removed through filtration. Volatile by-products and solvent are removed by distillation at 140° C. under an oil-pump vacuum. Product is a high molecular-weight silicone polymer of average chain length ~1200 suitable for use in Electron Beam and Ultra-Violet cured compositions.

Example 8

Charge 11,010 grams of the polymer from example 1 to a bread dough or similar type high consistency mixer equipped with heating jacket and which is rated for vacuum operation. Also charge 110 grams of Magnesium Oxide powder to mixer and mix for 30 minutes. With mixer on, add silicone silanol treating fluid (JPA-2, Shin-Etsu) and fumed silica (Aerosil 200, Degussa) using the following procedure. First add 223.7 grams of fluid and 567.5 grams of fumed silica to the mixer. Allow fluid and silica to mix until incorporated into polymer. Add a second increment of 567.5 grams of fumed silica and again allow silica to incorporate. Add a second increment of 223.7 grams of fluid and a third increment of 567.5 grams of fumed silica to the mixer and allow fluid and silica to mix until incorporated into polymer. Add a fourth increment of 567.5 grams of fumed silica and again allow silica to incorporate. Finish compounding by adding a third increment of 223.7 grams of fluid and a fifth increment of 567.5 grams of fumed silica to the mixer and start mixer. Allow fluid and silica to mix until incorporated into polymer. Add the sixth increment of 567.5 grams of fumed silica and again allow silica to incorporate. Once all of the fluid and silica have been added, seal mixer, start vacuum, begin slow nitrogen flow, and set mixer temperature to 150° C. Allow the mixer to mix compound at 150° C. for three hours. Cool mixer and release vacuum. Product is a high consistency material suitable for use as a moderate strength, radiation curable silicone rubber base.

Example 9

Charge 11,010 grams of the polymer from example 2 to a Ross Planetary Mixer or similar type planetary mixer equipped with heating jacket and which is rated for vacuum operation. Also charge 110 grams of Magnesium Oxide powder to mixer and mix for 30 minutes. With mixer on, add silicone silanol treating fluid (JPA-2, Shin-Etsu) and fumed silica (Aerosil 200, Degussa) using the following procedure. First add 223.7 grams of fluid and 567.5 grams of filmed silica to the mixer. Allow fluid and silica to mix until incorporated into polymer. Add a second increment of 567.5 grams of fumed silica and again allow silica to incorporate. Ad a second increment of 223.7 grams of fluid and a third increment of 567.5 grams of fumed silica to the mixer and allow fluid and silica to mix until incorporated into polymer. Add a fourth increment of 567.5 grams of fumed silica and again allow silica to incorporate. Finish compounding by adding a third increment of 223.7 grams of fluid and a fifth increment of 567.5 grams of fumed silica to the mixer and start mixer. Allow fluid and silica to mix until incorporated into polymer. Add the sixth increment of 567.5 grams of fumed silica and again allow silica to incorporate. Once all of the fluid and silica have been added, seal mixer, start vacuum, begin slow nitrogen flow, and set mixer temperature to 150° C. Allow the mixer to mix compound at 150° C. for three hours. Cool mixer and release vacuum. Product is a grease-like consistency material suitable for use as a radiation curable Liquid Silicone Rubber (LSR).

Example 10

Charge 7500 grams of the polymer from example 3 to a Ross Planetary Mixer or similar type planetary mixer equipped with heating jacket and which is rated for vacuum operation. Also charge 75 grams of Magnesium Oxide powder to mixer and mix for 30 minutes. With mixer on, slowly add 2250 grams of an acrylic functional silicone MQ resin (MQA-4, PCR) and 250 grams of a silazane capped Silanol type MQ resin (Dow Corning DC-1250, treated with 0.55 mol heptamethyldisilazane/mol OH groups). Allow resins to mix until incorporated into polymer. Add a second increment of 2250 grams of acrylic functional silicone MQ resin and 250 grams of silazane capped Silanol type MQ resin and again allow the resins to incorporate. Add the final increment of 2250 grams of acrylic functional silicone MQ resin and 250 grams of silazane capped Silanol type MQ resin. Allow the acrylic functional silicone MQ resin and silazane capped Silanol type MQ resin to mix for one hour. Seal mixer, start vacuum, begin slow nitrogen flow, and set mixer temperature to 110° C. Allow the mixer to mix material at 110° C. for three hours. Cool mixer and release vacuum. Remove product and test at room temperature. Product is a clear, pourable, radiation curable silicone composition suitable for use in repairable electrical insulation applications such as conformal coatings.

Example 11

Charge 11,010 grams of the polymer from example 4 to a Ross Planetary Mixer or similar type planetary mixer equipped with heating jacket and which is rated for vacuum operation. Also charge 110 grams of Magnesium Oxide powder to mixer and mix for 30 minutes. With mixer on, add silicone silanol treating fluid (JPA-2, Shin-Etsu) and fumed silica (Aerosil 200, Degussa) using the following procedure. First add 223.7 grams of fluid and 567.5 grams of fumed silica to the mixer. Allow fluid and silica to mix until incorporated into polymer. Add a second increment of 567.5 grams of fumed silica and again allow silica to incorporate. Add a second increment of 223.7 grams of fluid and a third increment of 567.5 grams of fumed silica to the mixer and allow fluid and silica to mix until incorporated into polymer. Add a fourth increment of 567.5 grams of fumed silica and again allow silica to incorporate. Finish compounding by adding a third increment of 223.7 grams of fluid and a fifth increment of 567.5 grams of fumed silica to the mixer and start mixer. Allow fluid and silica to mix until incorporated into polymer. Add the sixth increment of 567.5 grams of fumed silica and again allow silica to incorporate. Once all of the fluid and silica have been added, seal mixer, start vacuum, begin slow nitrogen flow, and set mixer temperature to 150° C. Allow the mixer to mix compound at 150° C. for three hours. Cool mixer and release vacuum. Product is a grease-like consistency which may be used as a silicone rubber base; or blended with materials from either Example 8 or Example 9 to adjust handling or cured performance. This material alone, or in blends as noted above, is then radiation curable.

Example 12

Charge 7500 grams of the polymer from example 2 to a Ross Planetary Mixer or similar type planetary mixer equipped with heating jacket and which is rated for vacuum operation. Also charge 75 grams of Magnesium Oxide powder to mixer and mix for 30 minutes. With mixer on, slowly add 2200 grams of a silanol functional silicone MQ resin (MQOH-4, PCR) and 300 grams of a silazane capped Silanol type MQ resin (Dow Corning DC-1250, treated with 0.55 mol heptamethyldisilazane/mol OH groups). Allow resins to mix until incorporated into polymer. Add a second increment of 2200 grams of silanol functional silicone MQ resin and 300 grams of silazane capped Silanol type MQ resin and again allow the resins to incorporate. Add the final increment of 2200 grams of acrylic functional silicone MQ resin and 300 grams of silazane capped Silanol type MQ resin. Allow the acrylic functional silicone MQ resin and silazane capped Silanol type MQ resin to mix for one hour. Seal mixer, start vacuum, begin slow nitrogen flow, and set mixer temperature to 110° C. Allow the mixer to mix material at 110° C. for three hours. Cool mixer and release vacuum. Product is a clear, pourable, radiation curable silicone composition suitable for use as a 100% solids, Pressure Sensitive Adhesive for electrical insulation and optical applications.

Example 13

100 parts of a gum polymer of the average structure $[(Z)_nG-SiMe_2O_{1/2}]_2[Me_2SiO_{2/2}]_{5000}[(Z)_nG-SiMeO_{2/2}]_6$ wherein $G(Z)_n$ is $-(CH_2)_6O-C(O)-CH=CH_2$, 25 parts of silica (FK-160, Degussa) and 4 parts of JPA-2 silanol fluid (Shin Etsu) were compounded to a silicone base on a laboratory scale Banbury Mixer using a five minute cycle with no cooling water. The base was then calendared between polyester film to a thickness of approximately 10–12 mm. Quadruplicate samples were made of Samples a through d by removing one of the polyester film surfaces from each sample and placing the pre-cut 12"×12" web pieces or sheets on the moving support web. Samples were then removed from the web after e-beam exposure, identified, and submitted for cured properties testing.

| Sample No. | a | b | c | d |
| --- | --- | --- | --- | --- |
| Specific Gravity | 1.16 | 1.18 | 1.18 | 1.17 |
| Durometer | 30 | 20 | 21 | 22 |
| Die B Tear (ppi) | 167 | 231 | 236 | 250 |
| 200% Modulus (psi) | 0? | 167 | 180 | 325 |
| Tensile (psi) | 182 | 417 | 431 | 850 |
| Elongation (%) | 86 | 575 | 550 | 475 |
| Cure conditions | EB | EB | EB | EB |
| Run Speed (fpm) | 200 | 200 | 200 | 200 |
| Reverse side? | No | No | No | Yes |
| Dose (Mrad) | 2 | 3 | 4 | 3 |

Results:

Sample a vs. Sample b illustrates the impact of dose level. Sample a was essentially uncured at 2 Mrads, whereas Sample b shows definite curing. But there is a negligible difference between Sample b and Sample c suggesting that the cure was not improved by increasing the dose further.

Next, one of the cured Samples b was re-exposed under the same conditions except the reverse side was placed upward towards the beam (sample d), demonstrating that two-sided irradiation can result in further improved material properties.

These results demonstrate that silicone elastomer materials with good material properties can be produced in a fast process by radiation-curing.

The above description is intended to be illustrative and not limiting. Various changes and modifications in the embodiments described herein may occur to those skill in the art. Those changes can be made without departing from the scope or spirit of the invention.

What is claimed is:

1. Compositions, which can be crosslinked by radiation to give elastomers or elastomeric coatings, which comprise:
    (a) high-molecular weight siloxanes with multiple (meth)acrylate functional groups; and
    (b) reinforcing fillers selected from the group consisting of silicone resins and silicone dioxide fillers,
wherein the siloxanes (a) have the general structure:

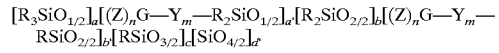

wherein

R is a linear or branched, alkyl, alkenyl or aryl radical which may be substituted with halogen atoms, $G(Z)_n$ is a (meth)acrylfunctional radical, wherein G is a (n+1) valent radical derived from a hydroxy compound with 3 to 10 carbon atoms, 1 to 6 hydroxy groups, 0 to 1 carboxylic ester groups and 0 to 2 ether linkages, which may optionally be unsaturated or alkoxylated with ethylene oxide, propylene oxide or mixtures thereof and wherein the organic groups bearing the acrylate radical(s) are attached to the siloxane framework by way of Si—C bonds, Y is —OOC—CHR'—CH$_2$— or —OOC—CHR'(CH$_3$)—, m is 0 or 1, n is 1–6, Z is —OC—CR'=CH$_2$ and may additionally comprise carboxylic acid radicals free of double bond, R' is hydrogen or methyl, a is 0–20, a' is 2–0, b is 800–10000, b' is 0–40, and c is 0–40, d is 0–40, with the proviso that the polymer contains more than two (meth)acrylate groups; and wherein the silicone resins of component (b) have the general structure:

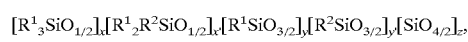

wherein

R$^1$ is a monovalent alkyl or alkenyl radical with 1 to 4 carbon atoms, phenyl, hydroxy, methoxy or ethoxy, R$^2$ is a (meth)acrylated hydroxyalkyl radical with 1 to 4 carbon atoms in the alkyl group, having a average molecular weight of 500 to 100,000, with the proviso that (x+x')/(y+y'+z) is 0.5 to 1.5 and (y+y')/z is 0 to 0.4.

2. The compositions according to claim 1 wherein c and d is 0, a is 0 to 2, a' is 0 to 2, and b is 2100–5000.

3. The compositions according to claim 1 wherein R is an alkyl radical with 1–8 carbon atoms, a fluorinated alkyl radical with 1–8 carbon atoms, vinyl or phenyl.

4. The compositions according to claim 1 wherein R is methyl.

5. The compositions according to claim 1 wherein Z is —C(O)—CH=CH$_2$.

6. The compositions according to claim 1 wherein m is 0 and G is selected from the group of

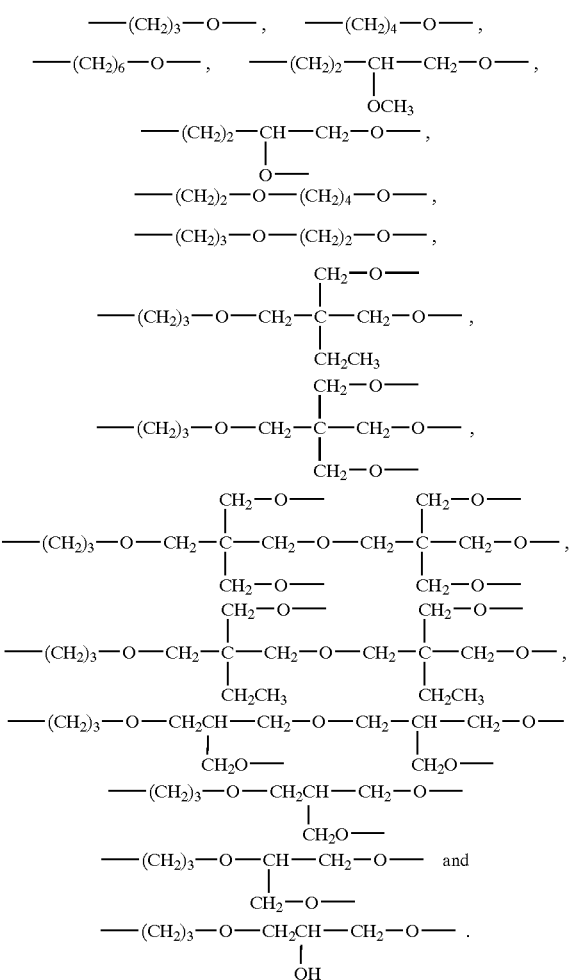

7. The compositions according to claim 1 wherein m is 1 and —Y—G— is

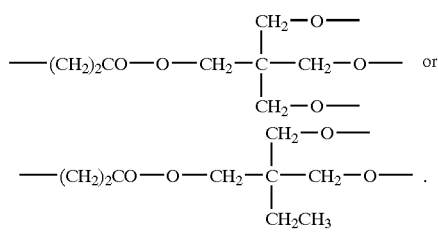

8. The compositions according to claim 1 wherein the reinforcing filler is selected from the group consisting of fumed silica, precipitated silica, hydrosols and silicates.

9. The compositions according to claim 1 wherein y and y' are 0, $R^1$ is methyl, $R^2$ is acryloxyethyl or acryloxypropyl, the ratio (x+x')/z is 0.7 to 0.9 and the average molecular weight of the resin is 500 to 10000.

10. The compositions according to claim 1 wherein y and y' are 0, $R^1$ is methyl, hydroxy, methoxy or alkoxy, the ratio (x+x')/z is 0.7 to 0.9, the average molecular weight of the resin is 500 to 10000, with the proviso that the resin contains less than 4% by weight, of silicon-bound hydroxy or alkoxy groups.

11. The compositions according to claim 1 wherein the reinforcing filler has been treated with methoxytrimethylsilane, ethoxytrimethylsilane, dimethyldichlorosilane, chlorotrimethylsilane, octamethylcyclotetrasiloxane, hexamethyldisilazane, silanol fluids, gamma-aminopropyltrimethoxysilane or gamma-methacryloxypropyltrimethoxysilane.

12. The compositions according to claim 1 wherein the reinforcing filler is a fumed or precipitated silica, which has been treated with a hydrophobizing silane agent.

13. The compositions according to claim 1, which further comprise one or more additives selected from the group consisting of extending fillers, catalysts, photoinitiators, photosensitizers, crosslinkers, co-curing additives, adhesion promotors, pigments and dyes.

14. The composition according to claim 13, wherein amount of extending filler is from about 1 to about 150 weight parts per 100 parts of siloxane (a) and reinforcing filler.

15. The composition according to claim 13 wherein the amount of catalysts, photoinitiators, photosensitizers, crosslinkers, co-curing additives, adhesion promotors, pigments or dyes is from about 0.1 to about 15 weight parts per 100 parts of the mixture of siloxane (a) and reinforcing filler (b).

16. The compositions according to claim 14 where the extending filler is selected from the group consisting of carbonates, hydrogen carbonates, oxides and hydroxides of calcium, magnesium or barium, talc, clay, titanium dioxide, barium zirconate, chalk, quartz, diatomaceous earth, polymeric beads/powders, iron oxide, metal powders, carbon black, metal salts, thermal conductive agents, magnetic and radio masking agents.

17. The compositions according to claim 14 which comprise about 20 to about 50 weight parts of extending filler per 100 parts of siloxane (a) and reinforcing filler (b).

18. The compositions according to claim 15 which comprise from about 1 to about 10 weight parts of photoinitiators per 100 parts siloxane (a) and reinforcing filler (b).

19. A process for preparing elastomers or elastomeric coatings which comprises irradiating the compositions according to claim 1.

20. Conformal coatings and pressure-sensitive adhesives obtained by the irradiation of the compositions of claim 1.

21. A method of high-speed radiation curing of calendared stock to give elastomeric coatings which comprises the compositions according to claim 1 with electrom beams or UV light.

* * * * *